(12) United States Patent
Helmi

(10) Patent No.: US 7,459,818 B2
(45) Date of Patent: Dec. 2, 2008

(54) ELECTRICAL MACHINE HAVING A ROTOR BEARING INTEGRATED IN THE STATOR

(75) Inventor: Hussam Helmi, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/857,222

(22) Filed: Sep. 18, 2007

(65) Prior Publication Data

US 2008/0054747 A1 Mar. 6, 2008

Related U.S. Application Data

(62) Division of application No. 10/528,970, filed on Mar. 23, 2005, now abandoned.

(51) Int. Cl.
*H02K 5/16* (2006.01)
(52) U.S. Cl. .......................... 310/90; 310/89
(58) Field of Classification Search ............. 310/89–90, 310/42; 417/410, 902
See application file for complete search history.

(56) References Cited

U.S. PATENT DOCUMENTS

| 4,940,396 A | * | 7/1990 | Shimizu et al. | ........... 417/410.5 |
|---|---|---|---|---|
| 6,056,523 A | * | 5/2000 | Won et al. | ...................... 418/15 |
| 6,280,154 B1 | * | 8/2001 | Clendenin et al. | ......... 417/410.5 |
| 6,608,410 B2 | | 8/2003 | Sato et al. | |

FOREIGN PATENT DOCUMENTS

| JP | 2235476 | 9/1990 |
|---|---|---|
| JP | 2000156952 | 6/2000 |
| JP | 2000299959 | 10/2000 |
| JP | 2001-8417 | 1/2001 |
| JP | 2001-32849 | 2/2001 |
| JP | 2002-305853 | 10/2002 |
| JP | 2002-345182 | 11/2002 |
| JP | 2003-74573 | 3/2003 |

\* cited by examiner

*Primary Examiner*—Thanh Lam
(74) *Attorney, Agent, or Firm*—Michael J. Striker

(57) ABSTRACT

The invention relates to an electrical machine and a method for assembling an electrical machine. The electrical machine includes a stator (1), which is received in a housing. The housing is closed by a housing cap (12). The electrical machine further includes a rotor (7), which includes a shaft (5) that is rotatably received in roller bearings (4). The roller bearings (4) are received by bearing rings (2), which are supported in the stator (1) of the electrical machine.

6 Claims, 4 Drawing Sheets

ELECTRICAL MACHINE HAVING A ROTOR BEARING INTEGRATED IN THE STATOR

CROSS-REFERENCE TO A RELATED APPLICATION

This application is a division of patent application Ser. No. 10/528,970 filed on Mar. 23, 2005 now abandoned. The invention described and claimed hereinbelow is also described in German Patent Application DE 10 312614.7 filed on Mar. 21, 2003. This German Patent Application provides the basis for a claim of priority of invention under 35 U.S.C. 119(a)-(d).

FIELD OF THE INVENTION

In electric motors, the rotor is supported in the housing or in the housing cap (motor end plate) by means of bearing seats. Both the housing surrounding the rotor and the housing cap (motor end plate) accordingly have bearing seats for rotatably supporting the rotor.

BACKGROUND OF THE INVENTION

In electric motors used today, bearing seats, into which the roller bearings that receive the rotor of the electric motor are inserted, are provided in the housing and in the housing cap, also known as a motor end plate, that closes the housing. The roller bearings may be either ball bearings or roller bearings or combined axial/radial bearings, depending on the particular intended use of the electric motor. The provision of bearing seats in the housing or in the housing cap (motor end plate) of an electric motor makes stringent demands in terms of dimensional stability of the components and means relatively high production effort and expense to attain bearing of the rotor as concentrically as possible relative to the stator of the electric motor. Under the operating conditions of the electric motor, the rotor should have an air gap that extends as concentrically as possible relative to the stator bore. Upon assembly of the electric motor, the stator is as a rule shrink-fitted into the cylindrical housing. The fit between the housing and the housing cap (motor end plate) that closes it causes positional errors with respect to the rotor axis, which often necessitate an additional grinding out of the stator bore and subsequent trimming on a lathe of the outer diameter of the stator, in order to attain the requisite dimensional stability with respect to a concentric air gap between the outside of the rotor and the inside of the stator bore.

Postmachining of the stator bore or of the outer diameter of the rotor on the one hand represents further production effort and expense for bringing about the concentricity of the air gap between the rotor and the stator bore of an electric motor. In an electrical machine, on the other hand, the air gap has considerable influence on the resultant efficiency.

The provisions made to assure a concentric air gap between the outer diameter of the rotor and the inner diameter of the stator bore by additional grinding out or subsequent turning on a lathe do offer one possible way of making the air gap of an electrical machine concentric, but they represent an extremely unsatisfactory, time-consuming provision that is highly disadvantageous in large-scale mass production of electric motors.

SUMMARY OF THE INVENTION

The solution to this problem proposed by the invention of integrating the bearing of the rotor with the stator of the electrical machines makes it possible on the one hand in terms of production to reduce the air gap between the outer diameter of the rotor and the inner diameter of the stator bore. This has a very favorable effect on the electrical efficiency of an electrical machine of this kind, since the chain of tolerances in the components involved is minimized, and now upon fitting in the components, that is, the housing cap (motor end plate) and the housing, tolerances that occur no longer have any influence on the air gap that develops between the outer diameter of the rotor and the inner diameter of the stator bore.

Compared to known variants for the bearing of the rotor of an electrical machine in the housing, the embodiment of the rotor bearing according to the invention in the stator already forms its own assembly unit, which makes it possible, within the production process of an electrical machine, to check the air gap by letting the rotor shaft freewheel before the housing is closed, or in other words before the preassembled stator/rotor unit is installed in the housing of an electrical machine.

The proposed solution makes greater dimensional stability possible, in terms of concentricity and angular errors of the rotor relative to the stator bore surrounding it. In designs in the prior art, because of the risk of scraping, that is, a possible mechanical contact between the rotor and stator, the tolerances with regard to the housing bearing were made greater, so that the resultant air gap was larger. When the embodiment of the invention is used in designing an asynchronous machine, for instance, it is constructively already possible to achieve a reduced concentric air gap that is maximally independent of the chain of tolerances.

The invention will be described in further detail below in conjunction with the drawing.

VARIANT EMBODIMENTS

Figure 1:
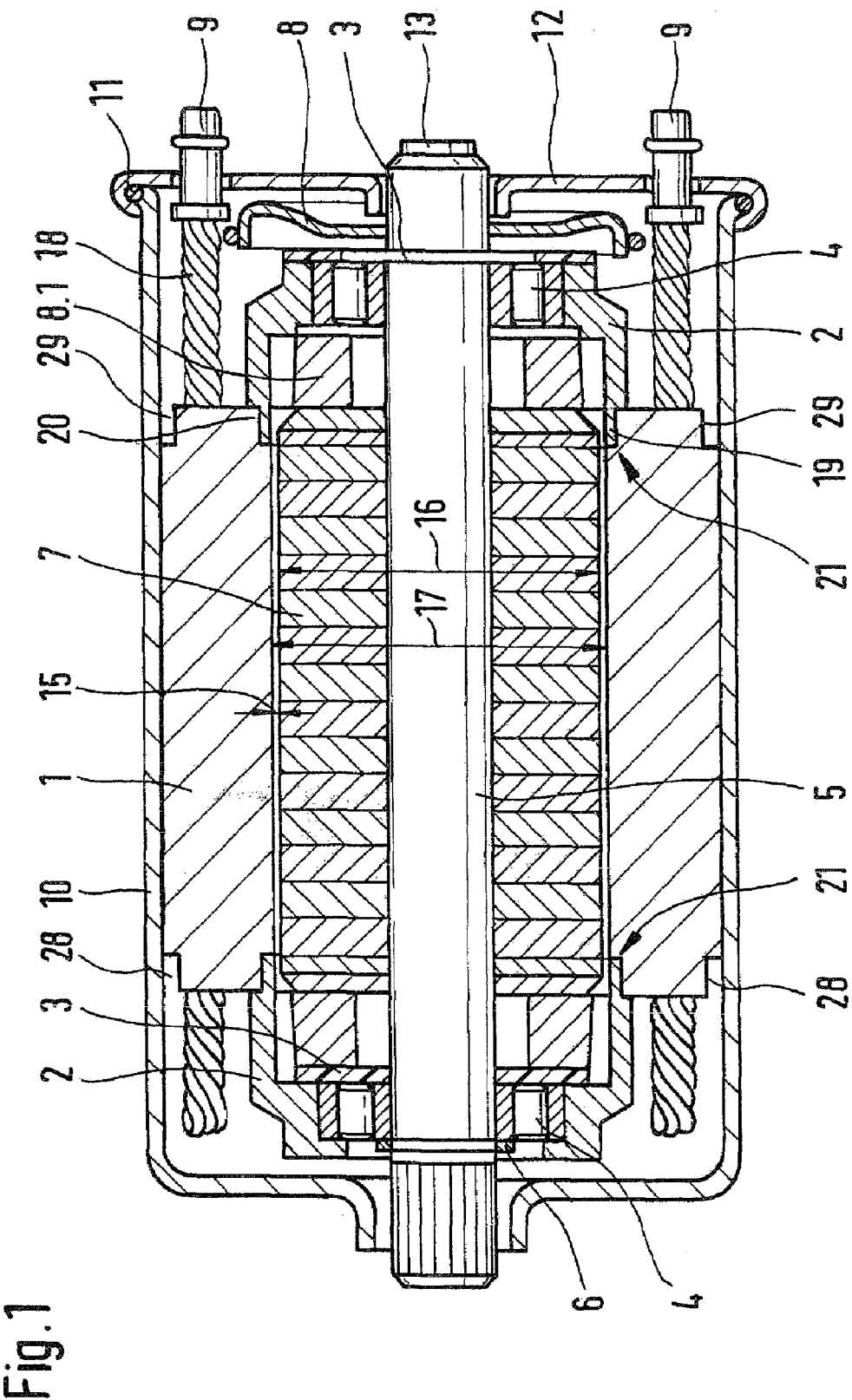
FIG. 1, a first variant embodiment of a rotor bearing integrated with the stator of an electric motor.

FIG. 1 shows the first variant embodiment of a rotor bearing integrated with the stator, in an electrical machine embodied as an electric motor.

The electrical machine shown in longitudinal section in FIG. 1 includes a stator 1, which is received in a substantially cylindrical housing 10 that is closed by means of a housing cap 12 (motor end plate). On each of its face ends at the stator bore, the stator 1 has countersunk features 20 on the face end, or countersunk features 28, 29 on the face end on the outer diameter of the stator, and these may be embodied for instance as annular grooves extending in the circumferential direction. One bearing ring 2 is let into each of the countersunk features 20 on both face ends of the stator 1 that is surrounded by the cylindrically configured housing 10. The bearing ring 2 has a bearing seat 21, in which a roller bearing 4 is received. The roller bearing 4 may be either a ball bearing or a roller bearing or a combined conical roller bearing, which is capable of absorbing both axial and radial forces. In the roller bearings 4 that are surrounded by the bearing rings 2, a rotor 7 of the electrical machine is rotatably supported. The rotor 7 includes a shaft 5, which penetrates the housing of the electric motor on both of its face ends, and on the end which passes through the housing cap 12 (motor end plate), it also has a magnet disk 13. The magnet disk 13 serves to detect the rpm of the shaft 5 of the rotor 7.

In the region of the bearing rings 2, insulating disks 3 are provided, which separate the baffles or the short-circuit ring 8.1 of the rotor from the roller bearings 4. If the spacing between the short-circuit ring 8.1 and the roller bearings 4 suffices, the incorporation of insulating disks 3 may be dispensed with. The respective roller bearings 4 surrounded by the bearing rings 2 are secured in their axial position via securing rings 6, which are received on the shaft 5 of the rotor 7. Via the short-circuit ring 8, the individual phases of the windings of the stator 1 can be short-circuited. The windings of the stator 1 can be supplied with current via contact pins 5, which penetrate the housing cap 12 (motor end plate) of the electrical machine.

The contact pins 9 that supply current to the windings of the stator 1 penetrate the housing cap 12. The housing 10 surrounding the stator 1 of the electrical machine includes a round seal 11, with which the cylindrical part of the housing 10 of the electric motor is connected to the housing cap 12 (motor end plate).

The air gap by which the rotor 7 is separated from the inner circumferential surface of the stator 1, is identified by reference numeral 15. The air gap 15 is defined on one side by the outer diameter 16 of the rotor 7 and on the other by the inner diameter inner diameter 17 of the bore of the stator 1.

The bearing according to the invention, shown in longitudinal section in FIG. 1, is embodied on the face ends of the stator 1 by the countersunk features 20 and 28, 29 that receive the respective bearing rings 2. As a result of this embodiment, the stator 1 and the rotor 7 may be fitted into the housing 10 of the electric motor as a unit that can be preassembled; it is already possible in the production process to check the air gap 15 with regard to free running of the rotor 7 in the inner bore of the stator 1 is already made possible in the production process, before the housing 10 is closed. Structurally, for instance in an electric motor embodied as an asynchronous machine, a reduced air gap can be achieved. The chain of tolerances in the embodiment proposed according to the invention is shortened substantially, compared to previous embodiments, and includes only the tolerance with which the countersunk features 20, 28, 29 are embodied on the face ends of the stator 1, as well as the dimensional stability of the bearing rings 2, receiving the roller bearings for the shaft 5, on both face ends of the stator 1 of the electrical machine. Because of the shortening of the chain of tolerances, greater dimensional stability is attainable with regard to the concentricity and the angular error of the rotor 7 relative to the inner bore of the stator 1. The integration, shown in longitudinal section, of the rotor bearing with the stator 1 of the electrical machine makes economical mass production possible in the manufacture of electric motors.

Advantageously, the countersunk features 20 or the countersunk features 28, 29 may be produced simultaneously in the outer regions of the face ends of the stator 1 during the production of a lamination packet on the stator 1 by the stamping process. The roller bearings 4 are fitted into the bearing rings 2, which can be press-fitted into either the countersunk features 20 embodied on the insides of the stator or the countersunk features 28, 29 located in the outer regions of the stator 1. The countersunk features 20, 28 as well as 29 each form one bearing seat 21 of the bearing ring 2, which in the exemplary embodiment shown in FIG. 1 is press-fitted into the countersunk features 20 located on the inside of the stator. The bearing rings 2 joined together along with the roller bearings are press-fitted into the countersunk features 20, 28, 29 on the face ends, after which the rotor 7 is fitted into the stator 1, and the shaft 5 is press-fitted into the inner rings of the roller bearings 4. This is done on both ends of the shaft. The bearing ring 2 defines a plane in the air gap 15 of the rotor 7 when it is press-fitted into the countersunk features 20 on the inside of the stator 1.

The length of the lamination packet of the stator 1 and rotor 7 is identical, so that the air gap 15 is realized over the entire length of the packet. As a result, any power losses from the countersunk features 20 located on the inside of the stator bore are maximally avoided. Likewise, the stamping process continues to be economical, and differences in length between the lamination packet formed by the stator 1 and rotor 7, which would increase the stamping waste, are avoided. Reference numeral 8.1 represents a short-circuit ring on the rotor 7 that is integrally injection molded on the face end thereof. The short-circuit ring 8.1 may for instance be made from aluminum.

The material of the bearing rings 2 used is nonmagnetic or nonelectrically conductive, to avoid an influence on the electrical rotating field in the winding heads.

Figure 2:
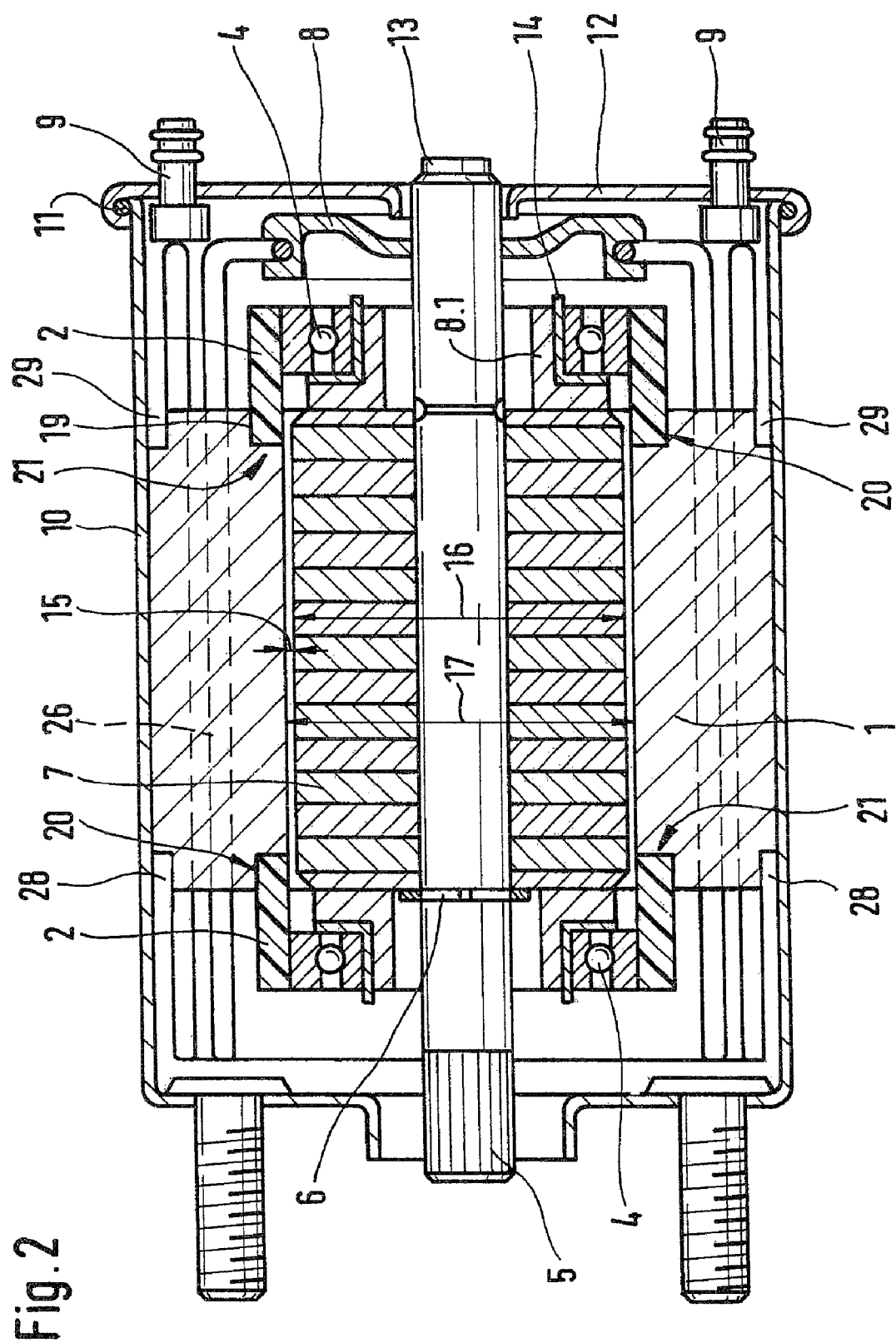
FIG. 2, a second variant embodiment of a rotor bearing integrated with the stator of an electric motor.

FIG. 2 shows a second variant embodiment of a rotor bearing integrated with the stator.

From the view in FIG. 2 it can be seen that the stator 1 is received in a cylindrically embodied housing 10 of the electric motor, which is closed off by means of a round seal 11 between the bearing ring 12 (motor end plate) and the cylindrical housing 10. The stator 1 of the electrical machine is pierced by through openings 26 for receiving the winding wires or contact pins 9. The contact pins 9 protrude out of the housing cap 12 (motor end plate) of the electrical machine.

The rotor 7 includes the shaft 5, which is rotatably supported by roller bearings 4. The roller bearings 4 are braced on bearing rings 2, which in turn are supported in countersunk features 20, 28 or 29 on the face ends of the stator 1, analogously to the variant embodiment shown in FIG. 1. Also analogously to the first variant embodiment shown in FIG. 1, the rotor 7 includes the shaft 5. The injection molded short-circuit ring 8.1 is received on the face end of the rotor 7. Via contact pins 9 penetrating the housing cap 12, current is supplied to the windings of the stator 1 of the electrical machine, in the variant embodiment of FIG. 2.

After the fitting of the roller bearings 4 into the bearing rings 2, the bearing rings 2 provided with the roller bearings 4 are fitted into the countersunk features 20, 28, 29, which may be embodied as annular grooves 19 extending all the way around, on the face ends of the stator 1. Upon fitting of the rotor 7 into the bore of the stator 1, embodied with an inner diameter 17, a short-circuit ring 8.1, which is preferably made from aluminum and whose thermal expansion behavior differs from the thermal expansion behavior of steel and also from that of the roller bearing inner ring 24, is inserted. The short-circuit ring 8.1 forms a bearing seat 27 for the roller bearing 4. Between the roller bearing 4 and the short-circuit ring 8.1, a bearing insulation 14 may—as shown in FIG. 2 be received. An expansion ring 30 may be injection molded into the short-circuit ring 8.1 that is integrally molded onto the face end of the rotor 7 (see illustration in FIG. 3).

Since the short-circuit ring 8.1 between the shaft 5 of the rotor 7 and the roller bearing 4 carries current, a bearing insulation 14 is provided, which is let in between the inner ring 24 of the roller bearing 4 and the short-circuit ring 8.1. The bearing insulation 14 may be dispensed with if roller bearings 4 are used whose inner rings 24 do not have electrically conductive races for roller bodies 23 (see illustration in FIG. 3).

Figure 3:
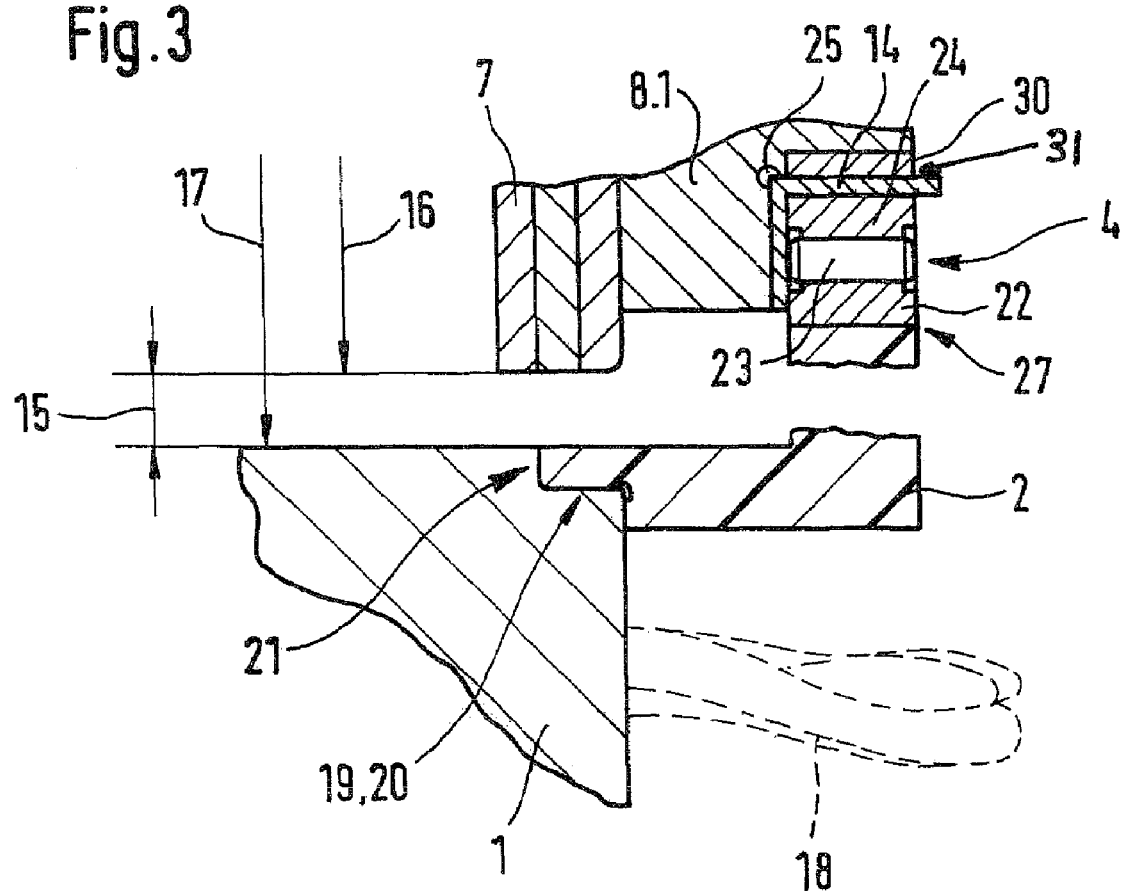
FIG. 3, an illustration on a larger scale of the rotor bearing integrated with the stator.

FIG. 3 is an illustration of the rotor bearing integrated with the stator, on a larger scale.

It can be seen from FIG. 2 that the bearing rings 2 that receive the roller bearings 4 are let into countersunk features 20, 28, 29, which may be embodied as annular grooves 19, extending all the way around on the face ends of the stator 1. The countersunk features 20, 28, 29 may, analogously to the exemplary embodiment shown in FIG. 1, be embodied on both the inner circumference and the outer circumference of the stator 1. The roller bearing 4—embodied here as a roller bearing—includes a roller bearing inner ring 24, which is received on the short-circuit ring 8.1. In the region of a bearing seat 31 of the roller bearing 4 on the short-circuit ring 8.1, a relief groove 25 is provided, so that the inner ring 24 of the roller bearing 4 is seated two-dimensionally. The roller bearing includes both a roller body 23, embodied as a cylinder, and an outer ring 22. The roller bearing outer ring 22 is received on a bearing seat 27 of the bearing ring 2. Parts of the windings of the stator 1 are designated by reference numeral 18. The air gap that results between the outer diameter 16 of the rotor 7 and the inner diameter 17 of the bore of the stator 1 is identified by reference numeral 15. The stator 1, the bearing ring 2, and the roller bearing 4 fitted into the bearing ring may be preassembled; as a result, because of the difference in diameter between the outer diameter 16 of the rotor 7 and the inner diameter 17 of the bore in the stator 1, a defined air gap 15 is established inside the thus-preassembled component assembly unit. The air gap 15 established during the preassembly is maintained during the assembly of the preassembled component unit, including the stator 1, rotor 7, bearing ring 2, short-circuit ring 8.1, and roller bearing 4, and is not changed by the installation of this component unit in the housing 10. The preassembled assembly unit makes it possible during the production process to check the air gap 15, let the rotor 7 run freely before the concluding final installation of this assembly unit in the housing 10, and to close the housing cap 12 on the cylindrical housing part by means of a round seal 11, as FIG. 2 shows.

As examples for designing the air gap 15, the following values can be named: For an outer diameter 16 of the rotor 7 of 49.8 mm with a tolerance of ±0.03 mm and an inner diameter 17 of the bore in the stator 1 of 50 mm±0.03 mm, an air gap 15 of 0.1 mm is established with a maximum oversize of 0.070 mm or a maximum undersize of 0.055 mm. These values for the air gap 15 are attained by providing that the chain of tolerances of the components involved is minimized, because some components that are subject to tolerances are eliminated. By means of the bearing rings 2 as well as the roller bearings 4 integrated with them, an air gap 15 can be established in a defined way within the production process, before this assembly unit is received in the housing 10 and the housing cap 12 is installed. As a result, in the design of an asynchronous machine, for instance, a reduced air gap 15 can be realized structurally and favorably affects the electrical efficiency of an electrical machine of this kind. The embodiment proposed according to the invention makes greater dimensional stability possible in terms of the concentricity and angular errors of the rotor 7 in the bore of the stator 1. The thinking before now, because of safety concerns for avoiding the risk of scraping, chose higher tolerances with regard to the housing bearing, which led to an increased air gap size. The chain of tolerances, which affects the size and concentricity of the air gap 15 between the stator 1 and the rotor 7, is determined essentially by the tolerances with which the countersunk features 20, 28, 29 that receive the bearing rings 2 are embodied on the end faces of the stator 1. A further link in the chain of tolerances that can be mentioned is the roller bearing seat 27 on the bearing ring 2, and possibly an expansion ring, identified by reference numeral 30, which for thermal reasons compensates for tolerances that occur in operation of the electrical machine. For compensating for expansions that occur upon heating of the electrical machine, the expansion ring 30 may be used, injection molded into the short-circuit ring 8.1 or embodied as an insulation 14, in the region of the inner ring 24 of the roller bearing 4.

Figure 4:
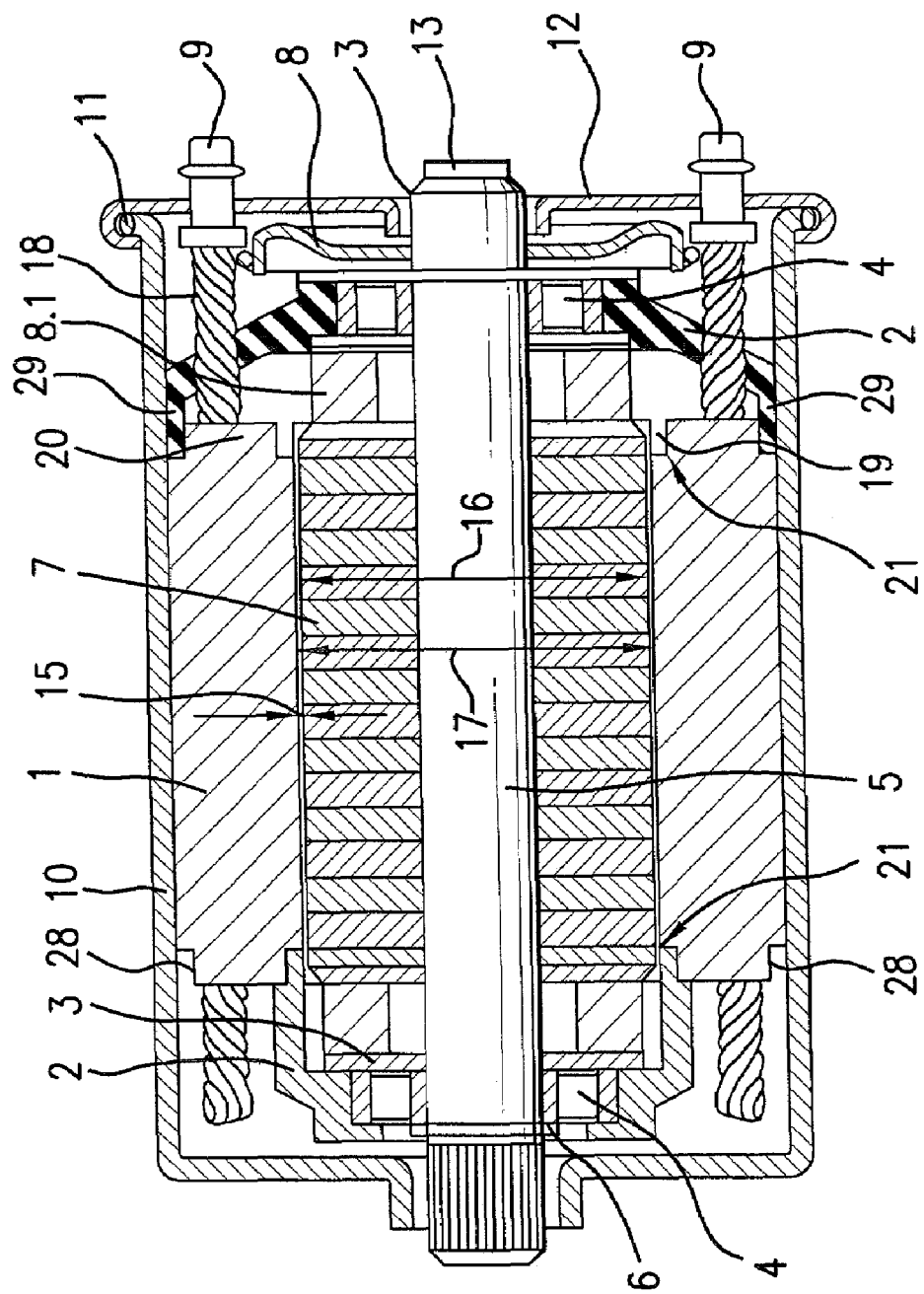
FIG. 4, shows a further variant of the present invention.

FIG. 4 shows an electrical machine in accordance with a further variant embodiment. This variant embodiment substantially corresponds to the first variant embodiment shown in FIG. 1, and additionally shows the bearing rings 2 which are press-fitted into the countersunk features or openings 28, 29. The countersunk features or openings 28, 29 are configured as annular grooves that are provided on the outer diameter of the stator 1 and on its face ends.

The invention claimed is:

1. An electrical machine, comprising a housing closed by a housing cap; a stator, wherein said stator directly and radially contacts said housing; a rotor including a shaft; roller bearings in which said shaft of said rotor is rotatably received; bearing rings which receive said roller bearings and are supported in said stator, said stator being provided on front sides with openings for receiving said bearing rings, said openings being configured as annular grooves extending in a circumferential direction and provided on an outer diameter of said stator, said bearing rings being press-fitted into said openings configured as said annular grooves provided on the outer diameter of said stator.

2. An electrical machine as defined in claim 1, wherein said bearing rings are composed of a non-electrically conductive material.

3. An electrical machine as defined in claim 1, wherein said roller bearings are joined to said bearing rings.

4. An electrical machine as defined in claim 1, wherein said stator is shrink-fitted into the housing, wherein said housing is cylindrical.

5. An electrical machine as defined in claim 1, wherein the stator and the rotor form a preassembled stator/rotor unit, which is mountable in the housing of the electrical machine.

6. An electrical machine as defined in claim 1, wherein the electrical machine is an electric motor, wherein said electric motor is an asynchronous motor.

* * * * *